United States Patent [19]

Chee

[11] Patent Number: 5,597,770
[45] Date of Patent: Jan. 28, 1997

[54] TITANIUM-BASED CATALYST COMPOSITION FOR POLYMERIZING ETHYLENE

[75] Inventor: Yong C. Chee, Seo-ku, Rep. of Korea

[73] Assignee: Hanwha Chemical Corporation, Seoul, Rep. of Korea

[21] Appl. No.: 215,414

[22] Filed: Mar. 21, 1994

Related U.S. Application Data

[63] Continuation of Ser. No. 169,222, Dec. 20, 1993, abandoned, which is a continuation-in-part of Ser. No. 889,233, May 28, 1992, abandoned.

[30] Foreign Application Priority Data

May 30, 1991 [KR] Rep. of Korea .................. 91-8944

[51] Int. Cl.$^6$ .................. C08F 4/654; C08F 4/651; C08F 10/02
[52] U.S. Cl. .................. 502/104; 502/125; 502/126; 502/119; 502/127; 526/125.4; 526/125.5; 526/124.6; 526/124.8; 526/352
[58] Field of Search .................. 502/104, 119

[56] References Cited

U.S. PATENT DOCUMENTS

| | | | |
|---|---|---|---|
| 4,379,758 | 4/1983 | Wagner et al. | 526/125 |
| 4,418,184 | 11/1983 | Ueda et al. | 526/125 |
| 4,732,882 | 3/1988 | Allen et al. | 526/125 |
| 4,803,251 | 2/1989 | Goode et al. | 526/74 |
| 4,845,177 | 7/1989 | Vogt et al. | 526/904 |

*Primary Examiner*—Edward J. Smith
*Attorney, Agent, or Firm*—Birch, Stewart, Kolasch & Birch, LLP

[57] ABSTRACT

A catalyst compound of the formula (I) is useful in the polymerization of ethylene into homopolymers or copolymers of high density and high melt flow ratio. The catalyst is prepared with a partial activation step before its complete activation with a co-catalyst.

$$Mg_aTi(OR)_bX_cAl_d(R'')_eX'_fH_{gi}[ED]_hB_iBr_{3i} \quad (I)$$

22 Claims, No Drawings

TITANIUM-BASED CATALYST COMPOSITION FOR POLYMERIZING ETHYLENE

CROSS-REFERENCE TO RELATED APPLICATIONS

This application is a continuation of prior U.S. application Ser. No.: 08/169,222, filed Dec. 20, 1993, which is a continuation-in-part of U.S. application Ser. No.: 07/889,233, filed May 28, 1992, both now abandoned, the entire contents of each application being hereby incorporated by reference.

BACKGROUND OF THE INVENTION

1. Field of the Invention

The present invention relates to a titanium-based catalyst, a method of preparing the same, and a method of using the same in an ethylene polymerization process.

2. Description of the Related Art

Titanium-based catalyst compositions have been known for use in polymerizing ethylene. For example, European Patent Publication No. 0 120 503 discloses a titanium-based catalyst that is used in producing low density ethylene copolymers. The catalyst composition disclosed therein is formed by impregnating, or mixing, a composition of formula (A) into an aluminum compound-treated silica, followed by activation with a co-catalyst of the formula (B):

  (A)

  (B)

wherein R is an aliphatic or aromatic hydrocarbon radical containing 1–14 carbon atoms, or COR', wherein R' is also an aliphatic or aromatic hydrocarbon radical containing 1–14 carbon atoms, X is selected from the groups consisting of Cl, Br and I or mixtures thereof, ED is an electron donor compound, m is 0.5–56, preferably 1.5–5, n is 0, 1, or 2, p is 2–116, preferably 6–14, q is 2–85, preferably 3–10, X' is Cl or OR", R" is an aliphatic or aromatic hydrocarbon radical containing 1–14 carbon atoms, wherein each R" substituent may be the same or different, e is 0–1.5, f is 0 or 1, and d+e+f is 3.

The catalyst thus obtained is shown to be useful in the polymerization of ethylene copolymers having a density of below 0.91 g/cm³ and a melt flow ratio of 37–40. However, it is difficult to increase the density of the copolymer to greater than 0.91 g/cm³. Indeed, the ethylene copolymer produced according to this process is generally considered a "very low density polyethylene." Therefore, the copolymer produced using this catalyst has poor strength, such as for film processing.

Another titanium-based catalyst composition is disclosed in U.S. Pat. No. 4,379,758. Here, after impregnating and/or mixing a precursor of the above formula (A) into a carrier, the precursor is reacted with a boron halide compound having the formula (C):

$$BR_cX'_{3-c}$$  (C)

wherein R is an aliphatic or aromatic hydrocarbon radical containing 1–14 carbon atoms or OR', wherein R' is also an aliphatic or aromatic hydrocarbon radical containing 1–14 carbon atoms, X' is selected from the group consisting of Cl, Br, and mixtures thereof, and c is 0 or 1 when R is an aliphatic aromatic hydrocarbon and 0, 1 or 2 when R is OR'.

The boron halide compounds can be used individually or in combination, and include $BCl_3$, $BBr_3$, $B(C_2H_5)Cl_2$, and $B(OC_2H_5)Cl_2$, most preferably $BCl_3$.

After treatment with the boron halide compound, the composition is then activated with a co-catalyst of formula (B). The catalyst is suitable for use in the polymerization of ethylene and forms a so called "high density polyethylene."

However, the melt flow ratio of the high density polyethylene produced using the catalyst in U.S. Pat. No. 4,379,758 is unsatisfactorily low and thus, affords poor productivity, i.e. difficult extrusion, etc.

SUMMARY OF THE INVENTION

Accordingly, it is an object of the present invention to provide a catalyst which can be used to polymerize ethylene into homopolymers or copolymers of high density and high melt flow ratio.

Another object of the present invention is to provide a process for preparing ethylene homopolymers or ethylene copolymers having a density of 0.91–0.97 g/cm³ and a melt flow ratio of 32–40.

It is another object of the present invention to provide a process for preparing a catalyst that can be used in this polymerization process.

These and other objects of the present invention can be obtained by a catalyst of the formula (I):

  (I)

wherein R is an aliphatic or aromatic hydrocarbon radical containing 1–14 carbon atoms, or COR', wherein R' is an aliphatic or aromatic hydrocarbon radical containing 1–14 carbon atoms, R" is an aliphatic or aromatic hydrocarbon radical containing 1–14 carbon atoms or OR''', wherein R''' is an aliphatic or aromatic hydrocarbon radical containing 1–14 carbon atoms, X is selected from the group consisting of Cl, Br, I and mixtures thereof, ED is an electron donor compound selected from the group consisting of aliphatic or aromatic alkyl esters, aliphatic ethers, cyclic ethers, and aliphatic ketones, a represents a number from 0.5–56 b represents 0, 1, or 2 c represents a number from 2–116, d is d'+0.33, wherein d' represents a number from 0–33, f represents a number from 0–1.5, g represents 0 or 1, e+f+g equal 3, h represents a number from 2–85, i represents a number from 2–85, j represents a number from 0–33, X' is Cl or OR"", wherein R"" is an aliphatic or aromatic hydrocarbon radical containing 1–14 carbon atoms, and H is hydrogen.

The catalyst according to formula (1) can be prepared by a process which comprises:

(a) diluting and impregnating a precursor composition of the formula (II) with an inert carrier, (b) partially activating the diluted impregnated precursor with at least one alkylaluminum compound of the formula (III), and (c) treating the partially activated precursor with a boron halide compound of the formula (IV);

$$Mg_a Ti(OR)_b Al_{0.33} X_c [ED]_h \quad (II)$$

$$Al(R'')_e X'_f H_g \quad (III)$$

$$BBr_3 \quad (IV)$$

wherein all variables are as defined above. Further, the catalyst according to formula (I) can be used to form polymers having a high density and a high melt flow ratio by polymerizing ethylene, or a mixture of ethylene and at least one alpha olefin containing 3–8 carbon atoms, in the presence of a catalyst of formula (I) and at least one alkylaluminum co-catalyst of formula (III).

DETAILED DESCRIPTION OF THE INVENTION

The catalyst of the present invention is represented by the following formula (I).

$$Mg_a Ti(OR)_b X_c Al_d(R'')_{ej} X'_{fj} H_{gj} [ED]_h B_i Br_{3i} \quad (I)$$

R represents an aliphatic or aromatic hydrocarbon radical containing 1–14 carbon atoms, or COR', wherein R' is an aliphatic or aromatic hydrocarbon radical containing 1–14 carbon atoms.

R" represents an aliphatic or aromatic hydrocarbon radical containing 1–14 carbon atoms or OR''', wherein R''' is an aliphatic or aromatic hydrocarbon radical containing 1–14 carbon atoms.

X is selected from the group consisting of Cl, Br, I and mixtures thereof.

ED is an electron donor compound selected from the group consisting of aliphatic or aromatic alkyl esters, aliphatic ethers, cyclic ethers, and aliphatic ketones. Preferably, the electron donor is tetrahydrofuran.

a represents a number from 0.5–56. b represents an integer of 0, 1, or 2, and is preferably 0. c represents a number from 2–116. d represents a number equal to d'+0.33, wherein d' is 0–33. f represents a number from 0–1.5, while g represents an integer of 0 or 1, and e+f+g equals 3. Preferably, g is zero. h represents a number from 2–85. i represents a number from 2–85, preferably 2–20. Indeed, i can be a number in the range of from about 3.9 to about 7.8. In one embodiment, i is a number in the range of about 10 to 85. j represents a number from 0–33. The subscript nomenclature "ej" indicates a subscript numerical value that is equal to the product of "e" and "j". For example, if e=3 and j=11, then $(R'')_{ej}$ is $(R'')_{33}$. The same is true, of course, for "fj" and "gj".

X' represents Cl or OR'''', wherein R'''' is an aliphatic or aromatic hydrocarbon radical containing 1–14 carbon atoms, and is preferably Cl. H represents hydrogen.

The catalyst is preferably carried on an inert carrier, as is well known in the prior art. As examples of suitable carrier materials, mention is made of inorganic materials such as oxides of silicon, aluminum, or both. Such materials generally being used in the form of fine powders having an average particle size of from about 10 to about 250 microns.

The catalyst according to the present invention can be formed by the process set forth above. A more detailed description of the catalyst preparation process and its use in polymerization is set forth below.

PREPARATION OF CATALYST PRECURSOR COMPOSITION

The compounds of formula (II) (hereinafter also referred to as a "precursor") can be formed by dissolving a titanium compound of the formula $TiOR_x Al_{1/3} X_z$ and a magnesium compound of the formula $MgX_2$ into an electron donor; wherein X and R are the same as defined above, x is 0, 1 or 2, and z is 2–4. Preferably the titanium compound is $TiCl_3 \cdot \frac{1}{3} AlCl_3$ and the magnesium compound is $MgCl_2$ anhydride. The mol ratio range of the magnesium and electron donor with respect to the titanium can be easily adjusted and it is easier to do quantitative control of the compounds in comparison to the use of $TiCl_4$, since $TiCl_4$ is decomposed to produce HCl.

After the titanium compound and magnesium compound are completely dissolved, the solution is mixed with a carrier, preferably silica which has been dehydrated at a temperature of 600° C., and then dried under nitrogen atmosphere to produce a freely flowing precursor composition. More preferably, the silica has been treated with an alkylaluminum compound before being mixed and/or impregnated with the solution. The result is the dilution of the precursor with silica by mechanically mixing or impregnating such a precursor composition into the silica thereby producing a fine precursor composition.

PARTIAL ACTIVATION OF CATALYST PRECURSOR COMPOSITION

The impregnated and diluted precursor composition should be treated with at least one alkylaluminum compound of the formula (III). At this time, the alkylaluminum compound to titanium compound molar ratio range should be below 4:1, preferably below 2:1–0.1:1, and the electron donor compound to alkylaluminum compound should be over 1:0.325. Thereafter, the treated mixtures are dried by nitrogen gas to produce a free flowing powder precursor composition. Preferably, the alkylaluminum compound is triethyl-aluminum, diethylchloro-aluminum, trihexyl-aluminum, especially tri-n-hexyl aluminum, and mixtures thereof.

The alkylaluminum compound treated precursor composition is then treated with a boron halide compound of formula (IV). At this time, the boron halide to electron donor compound molar ratio range should be over 0.1:1 so as to obtain the proper melt flow ratio of 22–42 according to the present invention. Also, the molar ratio of the alkyl aluminum, boron halide and electron donor should preferably satisfy the relationship $(Al(R'')_e X'_f H_g + BBr_3)/[ED] < 1$.

ACTIVATION OF CATALYST COMPOSITION

Because the inventive catalyst of formula (I) produced as described above has little or no activity, it is normally activated by the addition of a co-catalyst to the polymerization reactor during the polymerization process. The co-catalyst is at least one alkylaluminum compound represented by the above formula (III) and can be the same as, or different from, the alkylaluminum used in the above-described partial activation process. Preferably, the alkylaluminum compound used as the co-catalyst is triethyl-aluminum. If necessary, the alkylaluminum compound may be diluted with an inert solvent to a proper concentration before it is fed into the reactor.

POLYMERIZATION REACTION

Ethylene homopolymers and ethylene copolymers can be obtained by reacting ethylene monomer, or ethylene monomer and at least one alpha olefin comonomer having 3–8 carbon atoms, in the presence of the activated catalyst of the present invention and a proper amount of hydrogen. The reaction can be carried out by a variety of conventional techniques, including both batch-wise and continuous processes, and in both liquid phase and gas phase reactions. The reaction parameters are well known or easily determinable by workers skilled in the art. For example, using a slurry state reaction technique, the temperature can range from 80° to 90° C. and at a pressure less than or equal to 2,000 psi.

The ethylene homopolymer and copolymer produced have a density of 0.91–0.97 g/cm$^3$, a normal melt index of 0.01–10 g/10 min., a high load melt index of 20–1,000 g/10 min., and a melt flow ratio of 22–42, preferably 32–40, more preferably 33–40. These results are obtainable even when fixed, relatively mild reaction conditions are employed. This should be contrasted with the prior art, wherein the only way known for obtaining polymers of such density and high melt flow ratio was by (1) greatly varying the reaction conditions during the polymerization or by (2) using a non-titanium-based catalyst and extreme temperatures and pressures. The present invention thus provides for the formation of an enriched high molecular weight fraction, and hence improved melt flow ratio, without the drawbacks of the prior art processes.

RESIN

The density of the copolymers decreases gradually in proportion to the increase in the amount of comonomer. Thus, to achieve the same results with a different copolymer, in terms of a given density, at a given melt index level, a larger molar amount of the different comonomers are needed in the order of $C_3 > C_4 > C_5 > C_6 > C_7 > C_8$. The comonomer includes propylene, butene-1, pentene-1, hexene-1, 4-methylpentene-1, heptene-1 and octene-1. The normal and high load melt indices melt can be increased by adding more hydrogen.

The present invention will now be described in more detail in connection with the following examples which should be considered as being exemplary and not limiting the present invention.

The properties of the produced polymers were measured by the following conventional testing method.

Melt Index (MI): ASTM D-1238-Condition E-Measured at 190° C.-reported as grams per 10 minutes.

High Load Melt Index (HLMI): ASTM D-1238-Condition F-Measured at 10 times the weight used in the melt index test above.

Melt Flow Ratio (MFR)=High Load Melt Index/Melt Index

EXAMPLE 1

Impregnation of Precursor with Carrier 400 g of silica, which had previously been dried at 600° C. over about 12 hours, was contacted with about 8 l of anhydrous n-hexane and slurried in a 20 l reactor having a circulating cooling device and an agitator. Over 0.2 l of 1 molar triethyl aluminum in n-hexane was then added to the slurry. The slurry was dried with nitrogen gas at 45° C. for over 30 minutes to produce a dry powder having an average particle size of 40 μm.

The silica had a surface area of 20–500 m$^2$/g and an average pore size of 10–300 Å.

40 g of MgCl$_2$, 32 g of TiCl$_3$·⅓AlCl$_3$, 8 l of anhydrous tetrahydrofuran were charged to a 20 l four funnel bottom round flask having a circulating cooling device and an agitator. The mixture in the flask was completely dissolved with stirring at 65° C. overnight. The dissolved solution was added to the previously prepared dry silica powder and dried at 45° C. for 1 to 4 hours, until a free flowing powder was produced.

EXAMPLE 2

Partial Activation of the Catalyst Precursor

The silica impregnated precursor composition was slurried with 8 l of n-hexane in the flask defined in Example 1.

A proper amount of alkylaluminum compound was added to the slurried silica impregnated precursor composition prepared in accordance with Example 1 so as to maintain a molar ratio of 1:0.3 of the electron donor compound to the aluminum of the alkylaluminum compound. When the used hexane was removed from the powder precursor composition as described in Example 1, a free flowing powder was obtained.

EXAMPLE 3

Treatment of Partially Activated Precursor with Boron Tribromide

The partially activated silica impregnated precursor composition was slurried with 8 l of hexane in the flask defined in Example 2. A proper amount of borontribromide was added to the slurried silica impregnated precursor so as to maintain a molar ratio of 1:0.4 of the electron donor composition to borontribromide. The mixture was flushed and fried with nitrogen at 45° C. overnight to produce a free flowing dry powder having a particle size of the average silica.

EXAMPLES 4–15

Ethylene is polymerized at 90° C. in an experimental 2 l autoclave in following 12 examples. Examples 4–7 use a catalyst prepared according to example 1–3, while examples 8–11 use a catalyst prepared by a similar method except with an increased amount of alkyl aluminums. Example 12–15 use comparative catalysts based on TiCl$_4$ and different boron halides. The preparation for the comparative catalysts is given below.

In the polymerization, the ethylene to hydrogen molar ratio range is 2:1 to 8:1 and the amount of comonomer of butene-1 is 0–15 g, as is shown in the following Tables 1–3.

In Examples 4–7, the aluminum to titanium molar ratio range is 0.3:1 in the partial activating process.

TABLE 1

| Example | 4 | 5 | 6 | 7 |
|---|---|---|---|---|
| partial activation agent (outer of reactor) | $(C_6H_{13})_3Al$ $(C_2H_5)_2ClAl$ | $(C_6H_{13})_3Al$ $(C_2H_5)_2ClAl$ | $(C_6H_{13})_3Al$ $(C_2H_5)_2ClAl$ | $(C_6H_{13})_3Al$ $(C_2H_5)_2ClAl$ |
| boron halide activation agent (interior of reactor) | $BBr_3$ $(C_2H_5)_3Al$ | $BBr_3$ $(C_2H_5)_3Al$ | $BBr_3$ $(C_2H_5)_3Al$ | $BBr_3$ $(C_2H_5)_3Al$ |
| temperature (°C.) | 90 | 90 | 90 | 90 |
| $C_2H_4/H_2$ molar ratio | 4.7 | 3.2 | 1.8 | 1.6 |
| butene-1 (g) | 0 | 0 | 0 | 0 |
| melt index | 0.45 | 1.07 | 4.81 | 8.16 |
| melt flow ratio | 36 | 29 | 30 | 39 |

In the following Examples 8–11, the aluminum to titanium molar ratio is 2.3:1 in the partial activating process.

TABLE 2

| Example | 8 | 9 | 10 | 11 |
|---|---|---|---|---|
| partial activation agent (outer of reactor) | $(C_6H_{13})_3Al$ $(C_2H_5)_2ClAl$ | $(C_6H_{13})_3Al$ $(C_2H_5)_2ClAl$ | $(C_6H_{13})_3Al$ $(C_2H_5)_2ClAl$ | $(C_6H_{13})_3Al$ $(C_2H_5)_2ClAl$ |
| boron halide activation agent (interior of reactor) | $BBr_3$ $(C_2H_5)_3Al$ | $BBr_3$ $(C_2H_5)_3Al$ | $BBr_3$ $(C_2H_5)_3Al$ | $BBr_3$ $(C_2H_5)_3Al$ |
| temperature (°C.) | 90 | 90 | 90 | 90 |
| $C_2H_4/H_2$ molar ratio | 8 | 8 | 3.5 | 3.5 |
| $C_4$ | 0 | 15 | 0 | 15 |
| melt index | 0.19 | 0.4 | 0.34 | — |
| melt flow ratio | 39.16 | 33.5 | 32.4 | — |

TABLE 3

| Example | 12 | 13 | 14 | 15 |
|---|---|---|---|---|
| partial activation agent (outer of reactor) | — | — | — | — |
| boron halide activation agent (interior of reactor) | $BCl_3$ $(C_2H_5)_3Al$ | $BCl_3$ $(C_2H_5)_3Al$ | $BBr_3$ $(C_2H_5)_3Al$ | $BBr_3$ $(C_2H_5)_3Al$ |
| temperature (°C.) | 90 | 90 | 90 | 90 |
| $C_2H_4/H_2$ molar ratio | 1.6 | 1.6 | 1.6 | 1.6 |
| butene-1 (g) | 15 | 0 | 15 | 0 |
| melt index | 3.5 | 2.1 | 5.3 | 3.05 |
| melt flow ratio | 28 | 27 | 31 | 29 |

Comparative Catalyst Formation

The catalysts made from $TiCl_4$ and $BCl_3$ or $BBr_3$ shown above in examples 12–15 were prepared by the following method. In Dry-Box under $N_2$ atmosphere 0.4769 g of $MgCl_2$ was placed into a three neck round bottom flask having a magnetic spin bar, followed by sealing the necks with septa. Under a $N_2$ flush through the flask via needles through the neck seals, 100 ml of distilled tetrahydrofuran was added to the flask by an air tight syringe. The flask was then connected to a refluxing condenser and placed in an oil bath at 65° C. The $MgCl_2$ was dissolved by stirring the solution under $N_2$ atmosphere overnight.

0.351 g of $TiCl_4$ was then added to the flask by an air tight syringe and the solution was stirred for 30 minutes. After this, the solution was transferred to a new three neck flask which already contained 5 g of dried triethyl aluminum containing silica, as described in example 1, and a magnetic spin bar. The solution was then dried by stirring under $N_2$ flush at 65° C. for three hours, until a free flowing powder was observed.

150 ml of n-hexane was then added to the flask, resulting in a slurry, the oil bath was lowered to 45° C. and stirring was conducted for 30 minutes. Next, 13.3 cc (13.3 mole equivalent) of either $BCl_3$ or $BBr_3$ was added to the slurry and stirring was continued for another 30 minutes. Finally, the oil bath was increased to 65° C. and the slurry was dried under $N_2$ flushing for three hours.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A catalyst of formula (I):

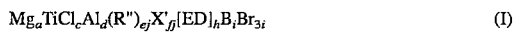

$$Mg_aTiCl_cAl_d(R'')_{ej}X'_{fj}[ED]_hB_iBr_{3i} \qquad (I)$$

wherein R" is an aliphatic or aromatic hydrocarbon radical containing 1–14 carbon atoms or OR''', wherein R''' is an aliphatic or aromatic hydrocarbon radical containing 1–14 carbon atoms, ED is an electron donor compound selected from the group consisting of aliphatic or aromatic alkyl esters, aliphatic ethers, cyclic ethers, and aliphatic ketones, a represents a number from 0.5–56 c represents a number from 2–116, d is d'+0.33, wherein d' represents a number from greater than zero to 33, f represents a number from 0–1.5, e+f equals 3, h represents a number from 2–85, i represents a number from 2–20, j represents a number from greater than zero to 33, X' is Cl or OR'''', wherein R'''' is an aliphatic or aromatic hydrocarbon radical containing 1–14 carbon atoms.

2. The catalyst according to claim 1, wherein i represents a number from about 3.9 to about 7.8.

3. A catalyst of formula (I):

$$Mg_aTiCl_cAl_d(R'')_{ej}X'_{fj}[ED]_hB_iBr_{3i} \quad (I)$$

wherein R'' is an aliphatic or aromatic hydrocarbon radical containing 1–14 carbon atoms or OR''', wherein R'''' is an aliphatic or aromatic hydrocarbon radical containing 1–14 carbon atoms, ED is an electron donor compound selected from the group consisting of aliphatic or aromatic alkyl esters, aliphatic ethers, cyclic ethers, and aliphatic ketones, a represents a number from 0.5–56, c represents a number from 2–116, d is d'+0.33, wherein d' represents a number from greater than zero to 33, f represents a number from 0–1.5, e+f equals 3, h represents a number from 2–85, i represents a number from 2–20, j represents a number from greater than zero to 33, X' is Cl or OR'''', wherein R'''' is an aliphatic or aromatic hydrocarbon radical containing 1–14 carbon atoms;

wherein said catalyst was produced from TiCl$_3$•⅓(AlCl$_3$) as the titanium source.

4. The catalyst according to claim 3, wherein ED is tetrahydrofuran.

5. The catalyst according to claim 3, wherein i represents a number from about 3.9 to about 7.8.

6. The catalyst according to claim 3, wherein said catalyst was produced by a process which includes the steps of dissolving MgCl$_2$ and TiCl$_3$•⅓(AlCl$_3$) in said electron donor compound ED in order to form a precursor compound.

7. The catalyst according to claim 4, wherein each R'' is independently selected from the group consisting of ethyl and hexyl.

8. The catalyst according to claim 7, wherein X' is Cl and f is not zero.

9. The catalyst according to claim 3, wherein the molar ratio of alkyl aluminum, boron tribromide and ED satisfy the relationship:

$$\frac{(Al(R'')_eX'_f + BBr_3)}{[ED]} < 1.$$

10. A process for producing a catalyst of formula (I), which comprises:

(a) diluting and impregnating a precursor composition of the formula (II) with an inert carrier, (b) partially activating the diluted impregnated precursor with at least one alkylaluminum compound of the formula (III), and (c) treating the partially activated precursor with a boron halide compound of the formula (IV);

$$Mg_aTiCl_cAl_d(R'')_{ej}X'_{fj}[ED]_hB_iBr_{3i} \quad (I)$$

$$Mg_aTiAl_{0.33}Cl_c[ED]_h \quad (II)$$

$$Al(R'')_eX'_f \quad (III)$$

$$BBr_3 \quad (IV)$$

wherein R'' is an aliphatic or aromatic hydrocarbon radical containing 1–14 carbon atoms or OR''', wherein R''' is an aliphatic or aromatic hydrocarbon radical containing 1–14 carbon atoms, ED is an electron donor compound selected from the group consisting of aliphatic or aromatic alkyl esters, aliphatic ethers, cyclic ethers, and aliphatic ketones, a represents a number from 0.5–56 c represents a number from 2–116, d is d'+0.33, wherein d' represents a number from greater than zero to 33, f represents a number from 0–1.5, e+f equals 3, h represents a number from 2–85, i represents a number from 2–20, j represents a number from greater than zero to 33, X' is Cl or OR'''', wherein R'''' is an aliphatic or aromatic hydrocarbon radical containing 1–14 carbon atoms.

11. The process according to claim 10, wherein i represents a number from about 3.9 to about 7.8.

12. The process according to claim 10, wherein said precursor composition of the formula (II) is produced by a process which comprises the steps of: dissolving at least one magnesium compound represented by the following formula (V) and at least one titanium compound represented by the following formula (VI) in at least one of said electron donor compounds, ED $$MgCl_2 \quad (V)$$

$$TiCl_3 \cdot \tfrac{1}{3}(AlCl_3) \quad (VI).$$

13. The process according to claim 12, wherein said electron donor compound is tetrahydrofuran.

14. The process according to claim 10, wherein in step (b), the molar ratio range of said aluminum compound to said titanium compound is below 4:1.

15. The process according to claim 14, wherein said molar ratio range is 2:1–0.1:1.

16. The process according to claim 10, wherein in step (b), the molar ratio range of said electron donor compound to said aluminum compound is over 1:0.325.

17. The process according to claim 10, wherein in step (c), the molar ratio range of said boron halide compound to said electron donor compound of said partially activated precursor is over 0.1:1.

18. The process according to 10, wherein said step (b) is carried out using a mixture of tri-n-hexylaluminum and di-ethylaluminum chloride.

19. The process according to claim 13, wherein said step (b) is carried out using a mixture of tri-n-hexylaluminum and di-ethylaluminum chloride.

20. A catalyst produced according to the process of claim 10.

21. A catalyst produced according to the process of claim 13.

22. A catalyst produced according to the process of claim 19.

* * * * *